Figure 1:
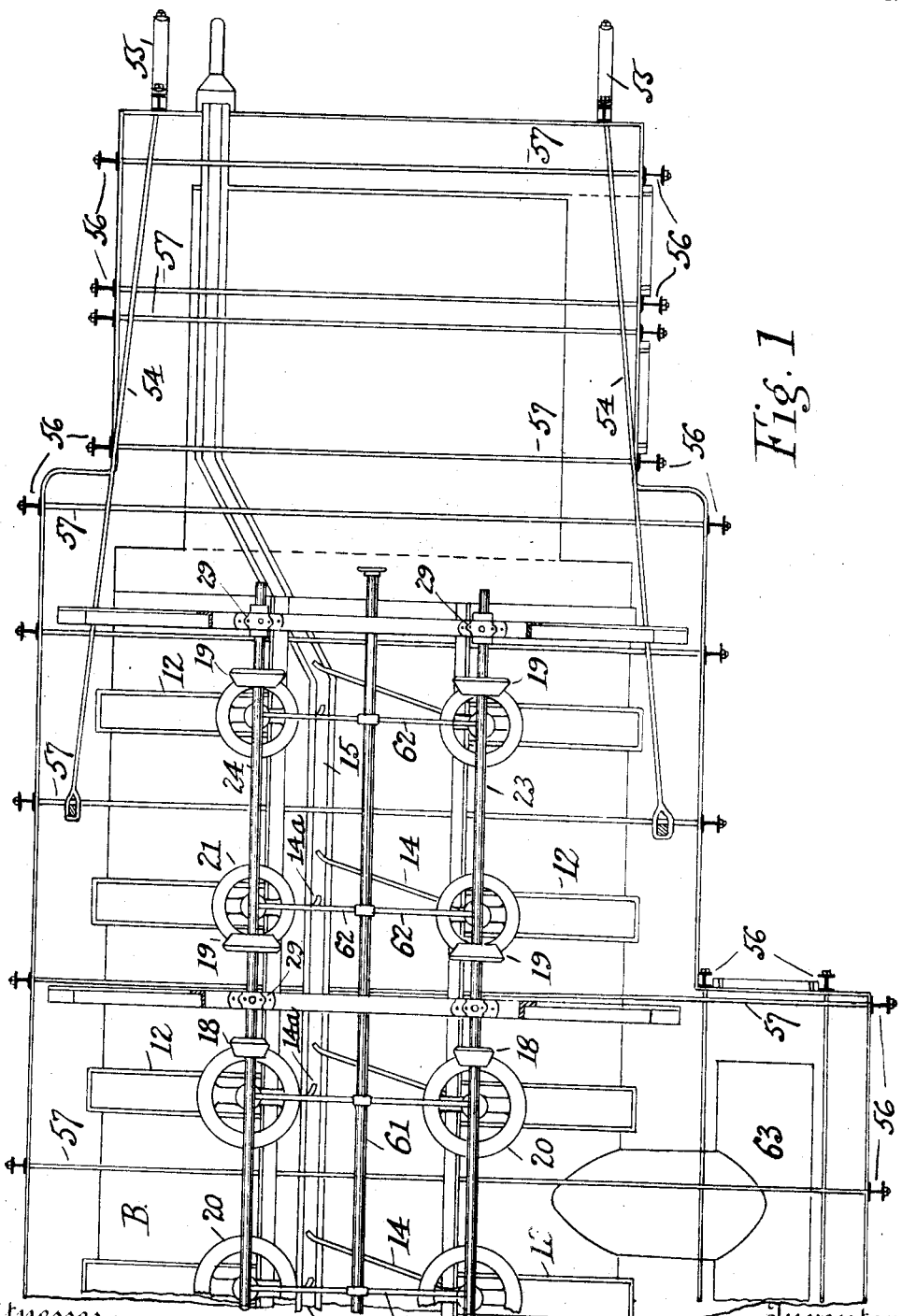

T. EDWARDS.
ORE ROASTING FURNACE.
APPLICATION FILED OCT. 18, 1910. RENEWED JUNE 3, 1912.

1,036,814.

Patented Aug. 27, 1912.

8 SHEETS—SHEET 1.

Witnesses:
Edw L. Tolson
Bent. W. Stahl

Inventor:
Thomas Edwards,
by Spear, Middleton, Donaldson & Spear
per Walter Donaldson
Attorneys.

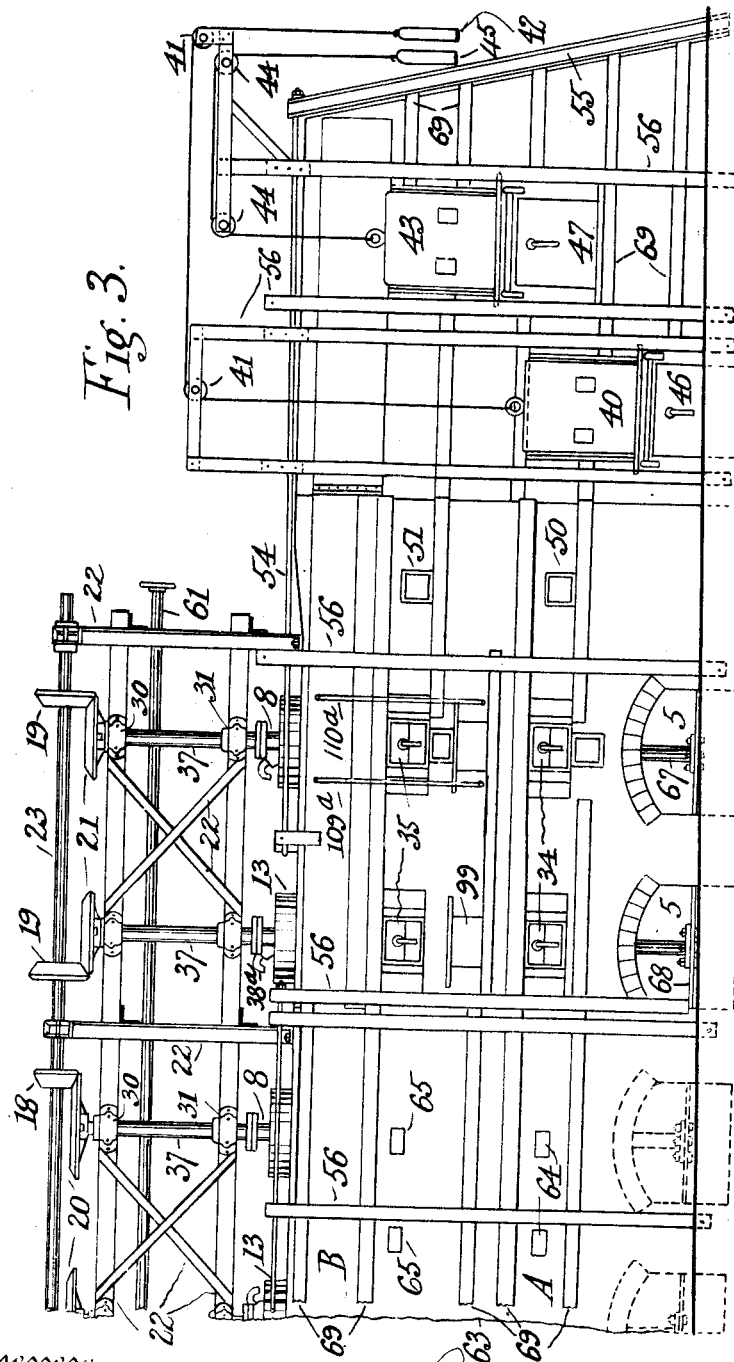

T. EDWARDS.
ORE ROASTING FURNACE.
APPLICATION FILED OCT. 18, 1910. RENEWED JUNE 3, 1912.
1,036,814.
Patented Aug. 27, 1912.
8 SHEETS—SHEET 4.
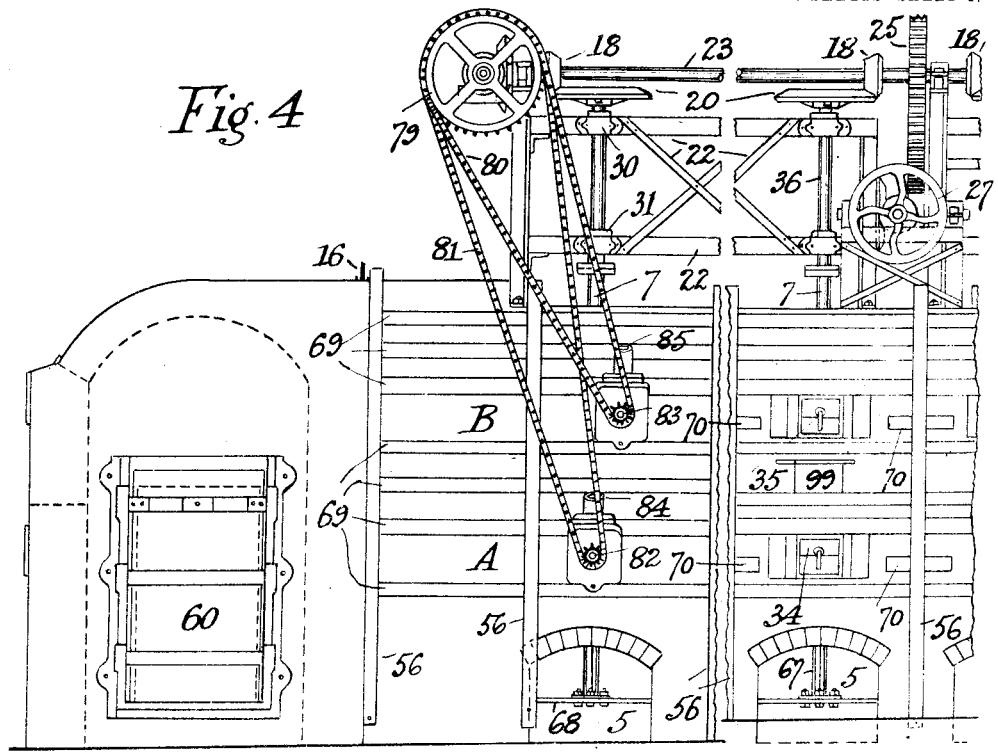
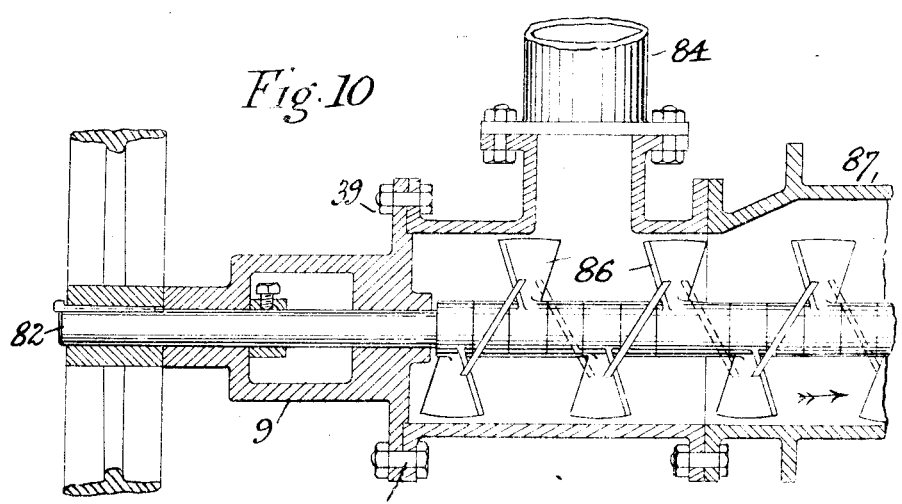

T. EDWARDS.
ORE ROASTING FURNACE.
APPLICATION FILED OCT. 18, 1910. RENEWED JUNE 3, 1912.
1,036,814.
Patented Aug. 27, 1912.
8 SHEETS—SHEET 5.
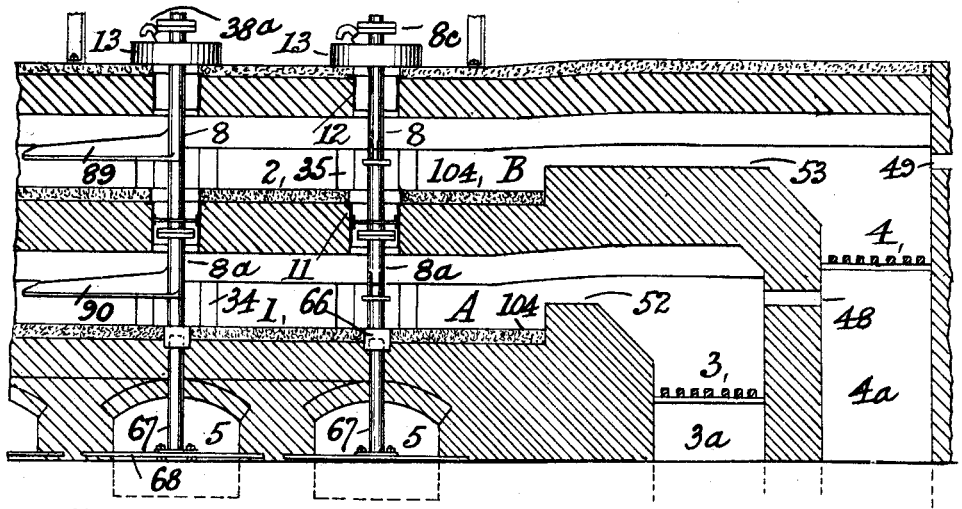
Fig. 6
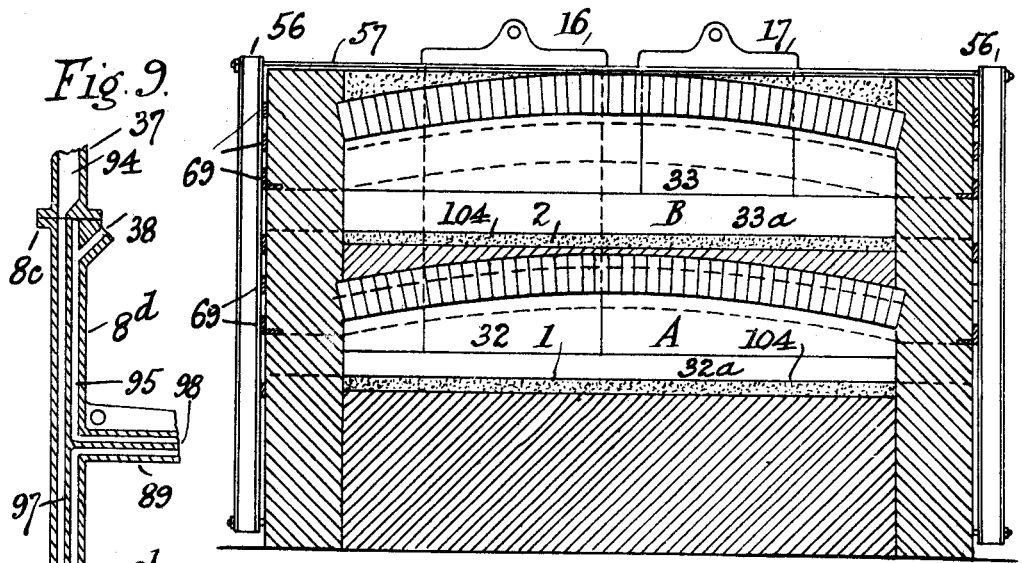
Fig. 9.   Fig. 5
Fig 11
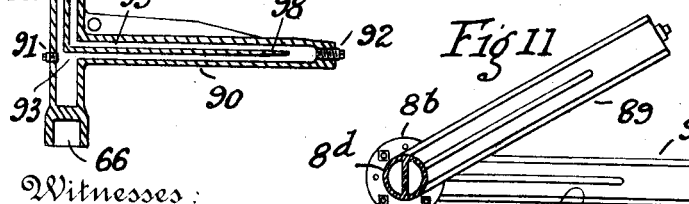
Witnesses:
Inventor.
Thomas Edwards,
by Spear, Middleton, Donaldson & Spear
per Walter Donaldson
Attorneys.

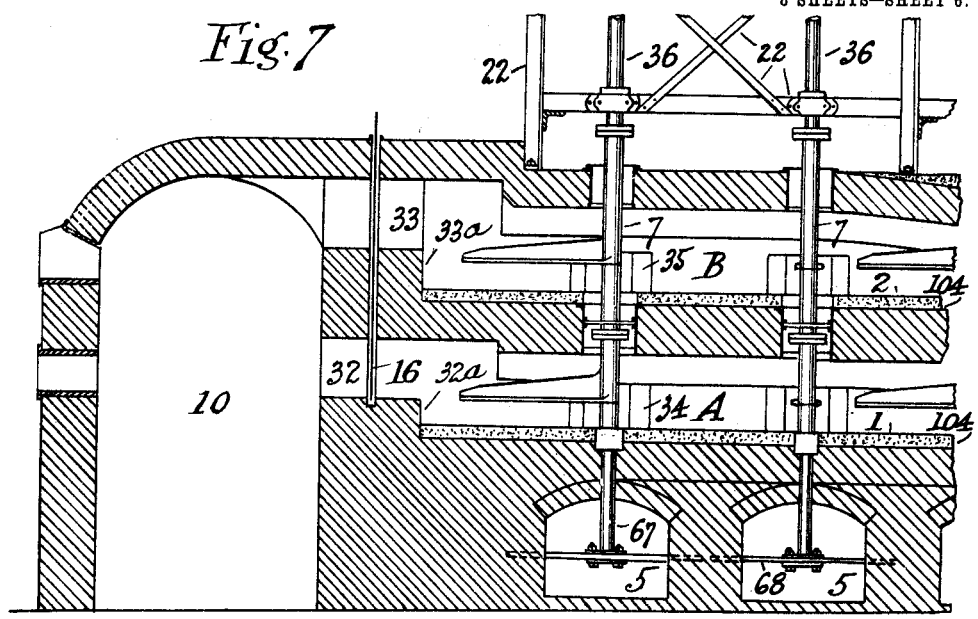
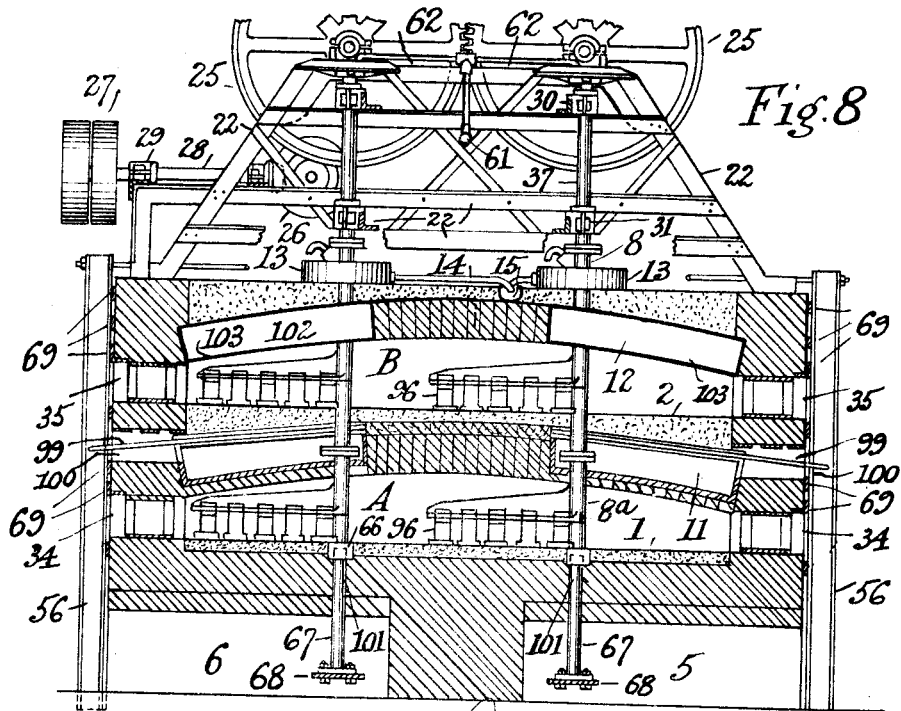

T. EDWARDS.
ORE ROASTING FURNACE.
APPLICATION FILED OCT. 18, 1910. RENEWED JUNE 3, 1912.
1,036,814.
Patented Aug. 27, 1912.
8 SHEETS—SHEET 7.
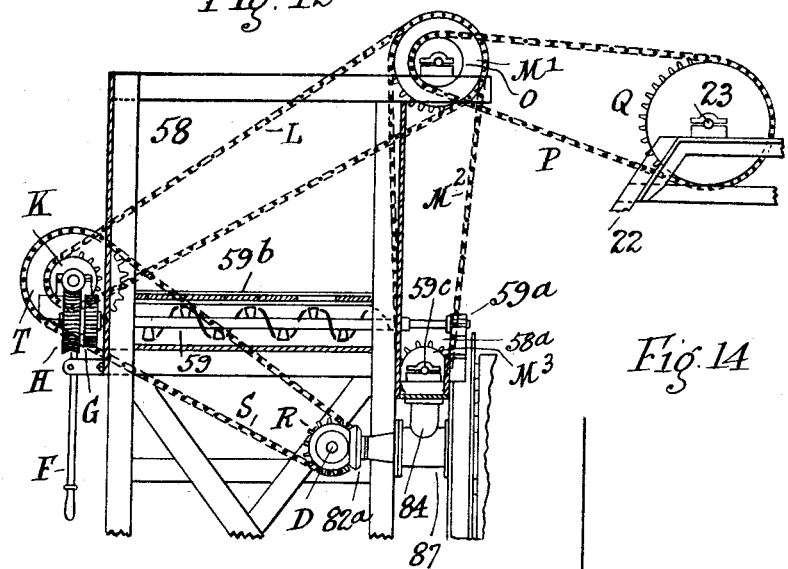
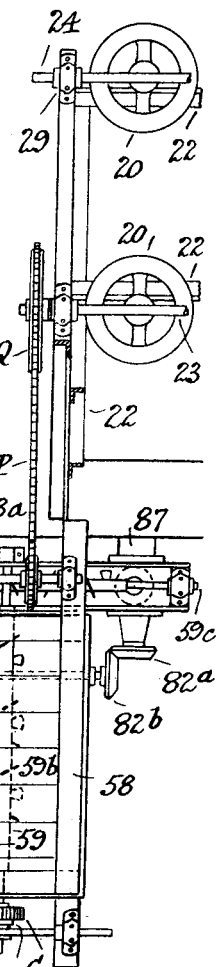

T. EDWARDS.
ORE ROASTING FURNACE.
APPLICATION FILED OCT. 18, 1910. RENEWED JUNE 3, 1912.
1,036,814.
Patented Aug. 27, 1912.
8 SHEETS—SHEET 8.
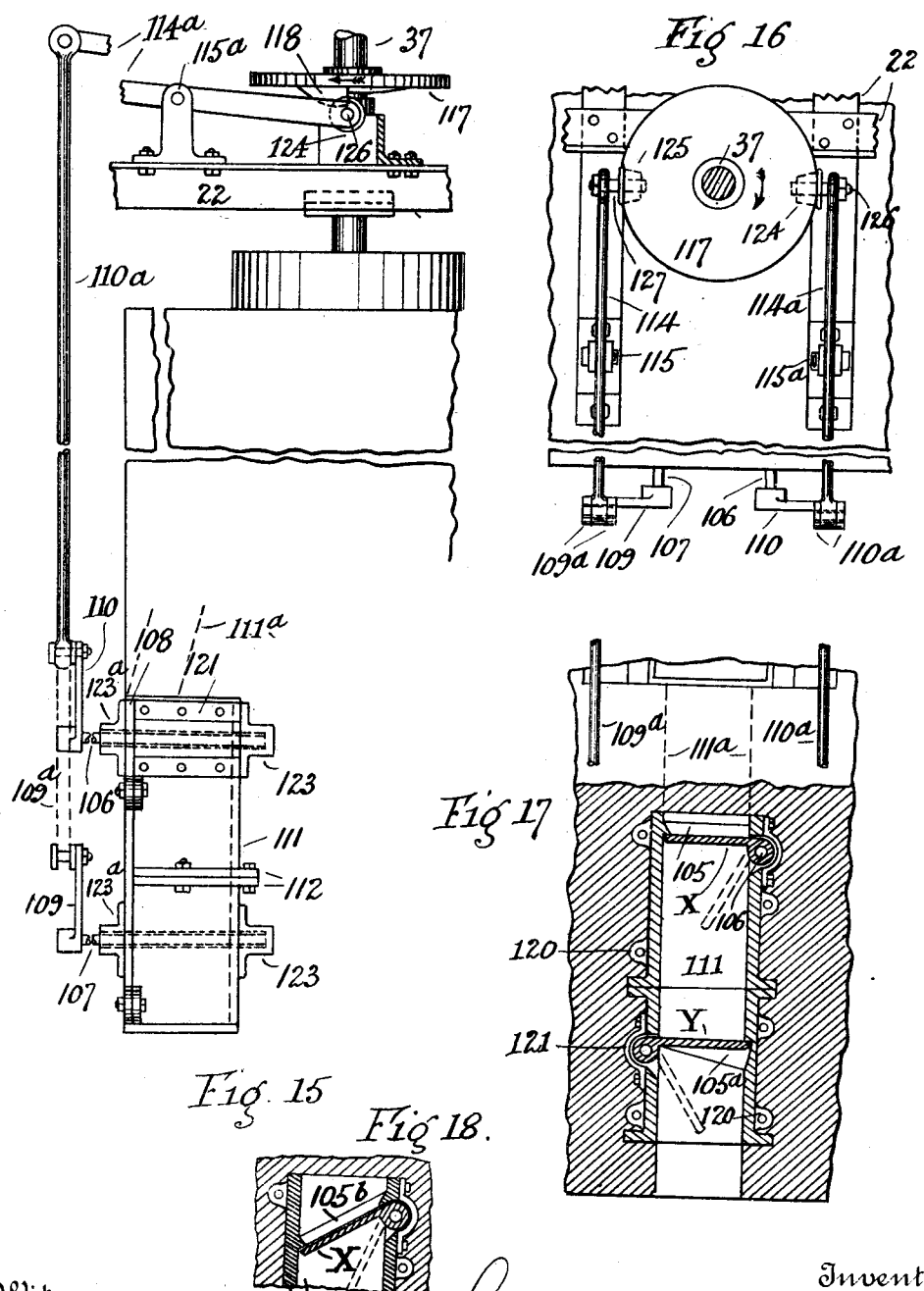

UNITED STATES PATENT OFFICE.

THOMAS EDWARDS, OF BALLARAT, VICTORIA, AUSTRALIA.

ORE-ROASTING FURNACE.

1,036,814.      Specification of Letters Patent.      Patented Aug. 27, 1912.

Application filed October 18, 1910, Serial No. 587,738. Renewed June 3, 1912. Serial No. 701,432.

*To all whom it may concern:*

Be it known that I, THOMAS EDWARDS, a subject of the King of Great Britain and Ireland, &c., residing at Ballarat, in the State of Victoria, Commonwealth of Australia, have invented certain new and useful Improvements in Ore-Roasting Furnaces; and I do hereby declare the following to be a full, clear, and exact description of the invention, such as will enable others skilled in the art to which it appertains to make and use the same.

This invention comprises improvements in ore roasting furnaces and the like. My construction is applicable, but not limited, to cases where the space available is restricted in length. My furnace is effective, easy to work, and allows of economical operation. The roast when treating auriferous or argentiferous ore allows of comparatively high extraction of gold, or silver, or both.

I provide superimposed hearths; but may heat and use only one hearth; or two or more (not in communication with each other) are heated and used at once. Each hearth has an independent end fireplace, at the same end and accessible from the same side of the furnace, one not immediately above the next but in an oblique line therefrom. Rabbles are rotated, but not all at one speed; they are in one or more longitudinal rows, with stems projecting into the bottom hearth. The same mechanism that drives the rabbles drives ore feeding means to supply the (or each) hearth, and ore discharge or dropper means.

The raw ore or other material is automatically introduced in predetermined quantities, and in an advantageous and regular manner, so that the temperature within the furnace will not unduly fluctuate by unevenness in the distribution of the ore as it travels the length of the furnace. The screw feeds some inventors use are defective.

The ore discharge or dropping means is arranged to readily permit of the cleaning and renewal of parts, and to act as a dust preventer. Any current of air passing up into the furnace through a plain discharge hole would carry valuable metalliferous dust from the roasted ore back through the furnace, and out of the latter into the flues. This would involve loss, as roasted ore thus carried off becomes mixed with arsenical or other flue deposits. If there is a plain drop of hot rabbled ore from one hearth to another, undue dust is also created in the furnace, and part becomes lost in the flues.

Any suitable material is usable in construction; thus common brick furnace bodies are suitable, except about the fireplaces, and to about the second rabble therefrom, where firebrick is suitable; rabbles and other metal work are ordinarily of cast iron, or steel, as will be well understood.

In the accompanying drawings my construction is illustrated; some known features of furnaces are also shown for more complete explanation, and other known features are not shown, though usable. Teeth of various gear wheels are, for example, omitted.

Figure 2:
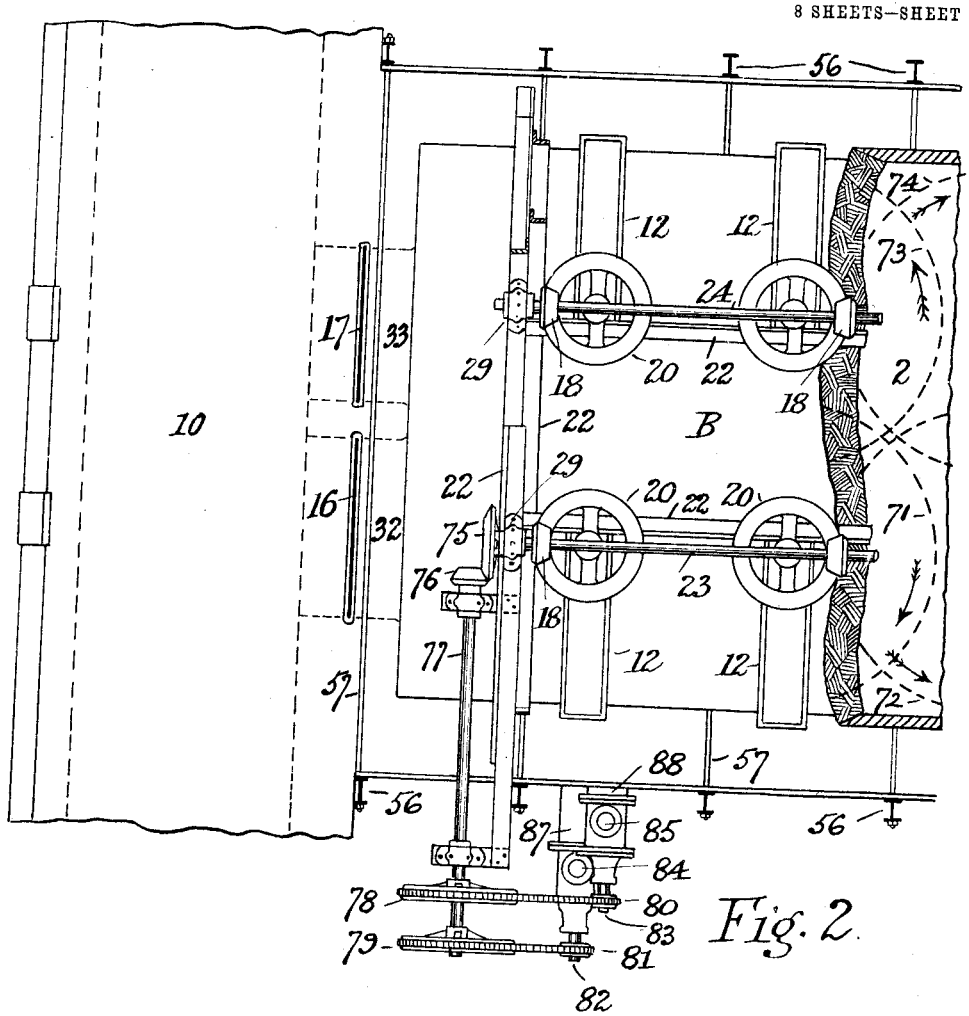

Figure 1 is a plan of parts of a two hearth furnace at the fireplace end; Fig. 2 a plan at the flue end. Fig. 3 shows in side elevation parts at the fireplace end; Fig. 4 in side elevation parts at the flue end, and an intermediate portion; Fig. 5 parts at the flue end in vertical cross section; Fig. 6 a side elevation of parts at the fireplace end; Fig. 7 parts at the flue end, in vertical section; Fig. 8 a vertical cross section. Fig. 9 shows a water rabble in sectional elevation, and Fig. 10 shows in vertical section, part of the furnace feeding means. Fig. 11 shows, in plan view, a diagram of the rabble stem in Fig. 9 with the feet adjusted to be one not directly above the other. Fig. 12 is an end view in vertical section through an ore bin of my preferred ore feeder; Fig. 13 is a side elevation of the feeder; and Fig. 14 is a plan view of the said feeder with the ore bin or hopper top open. Fig. 15 is an end elevation of the ore dropper, while Fig. 16 is a plan view, and Fig. 17 (partly in vertical section) a side elevation thereof; and Fig. 18 exhibits modified details.

The invention is not limited to the designs, numbers of parts, or sizes illustrated: the scales in these figures differ.

In these drawings, A and B are furnaces having longitudinal hearths 1, 2, one above the other, with adjoining end fireplaces 3, 4, with doors 40, 43, on the same side. These doors are suitably movable as by sliding in iron frames, or suitable grooves, and have balance weights 42, 45, connected by chains or ropes passing over pulleys 41, 44.

53 is a firebridge, wider than that (as 52) below it, so that one furnace as B overlaps that under it as A. While preserving an overlap, however, there may be modifications of firebridge and other details.

Ashpits $3^a$, $4^a$, are provided with any suitable frames and doors 46, 47. The fire boxes have air inlets to facilitate combustion, one shown at 48 into furnace A, and one at 49 into furnace B. A door 50 with suitable frame is provided near the firebridge at each side of the lower furnace, and above it a door 51 at each side of each higher furnace. Any door is opened when air admission and access to the hearth is required.

Each hearth is suitably arranged to allow of ore reaching its discharge end, the furnace foundations being advantageously built portion above and portion (at the fireplace end) in the ground. Under the bottom furnace are recesses 5, allowing direct access to rabble supports from the furnace side. When there are two lines of rabbles, there are recesses 6 along the other side, or recesses may pass right across.

The upper furnace top carries metal, or any suitable frames, rails, and connections which support gearing. The drawings do not show all the framing; but various stays, bolts, angle irons, and strengthening rails, are marked 22, and there are bolts 54,—buck stays as 55, plates 70, other stays 56 at intervals (Fig. 4), the bolts 57 with nuts or other fastenings, and longitudinal stays 69. Bearings or the like as 30, 31, support rabble spindles.

At 63 are superimposed or adjacent side fireplaces with side air holes 64, to the lower, and 65 to the upper one.

10 is the main flue; passage 32 to it from furnace A is regulated by damper 16, passage 33 from furnace B by damper 17; these dampers are adjacent so that either can be readily attended to, and they pass through suitable recesses.

$32^a$, $33^a$ are end walls.

60 is access means to flue 10.

The ore discharge is by metal or other dropper casings or passageways, inclined or vertical, or partly each, which extend from the hearth or hearths. The dropper shown in Figs. 15 to 18 is for one hearth, but the application to a plurality of superimposed hearths is obvious; it is not shown in Fig. 3 as the scale is so small but the position is indicated by the parts there shown of the rods $110^a$, $109^a$, mentioned hereinafter. This dust preventing dropper includes a downwardly extending casing, $111^1$ of rectangular, or other cross section, open when in use (and altogether if desired) at each end; and of any length and cross sectional area, in one piece or in sections joined or secured together, as by flanges 112. Casing 111 has any suitable vertical or inclined top passage to it from a hearth, as through the furnace wall as dotted at $111^2$. The casing shown extends down the furnace side, built or let thereinto, but may stand out therefrom extending in any direction desired. It may be arranged to extend from below one hearth within a furnace to any suitable point over a lower hearth.

When using superimposed hearths, there will (in some cases) be one or more distinct dropper casings from each with appropriate flaps or valves below described, and operating means. The working of the furnace hearths, as belonging to two or more separate or independent furnaces, then allows two or more separate lots or kinds of ore, not to be mixed, to be treated simultaneously yet separately, which course saves both time and expense.

Along each hearth are holes at both sides with iron or metal frames and closing doors 34 in the lower, and 35 in the upper furnace for sighting and other usual purposes.

Main longitudinal shafts 23, 24, are provided, one for each line of rabbles, with suitably geared connections as toothed bevel pinions 18, with at the fireplace end two larger pinions 19. Each pinion gears with a bevel wheel 20 (or at the fireplace end a bevel wheel as 21) mounted on a rabble spindle. The rabble spindles at the fire end travel faster, and cause rabble feet there to move around twice as fast as do the other rabble spindles. This brings the ore into thorough contact with the air, the oxygen of which facilitates decomposition of sulfates formed in the furnace, and oxidizes the ore to a "sweet" roast, at the hottest part of the hearth. The discharge of roasted ore is also expedited.

Shafts 23, 24, are suitably rotated, for example by gear wheels 25 driven by pinion 26 receiving motion from gearing on shaft 28 having drive pulley 27. Various shafts have bearings 29.

36 are non-water rabble spindles, and 37 water rabble spindles.

61 is a pipe by which water is carried to branches 62 (having suitable valves) into the tops of rabble spindles 37.

Two lines of rabble stems extending into each furnace are shown, non-water rabbles marked 7, and water rabbles 8. The rabble stems have integral partitions when intended for cooling purposes, and all desired rabble stems are in flanged lengths $8^d$, $8^a$, bolted or adjustably connected between the respective feet on said stems,—and above the upper foot as at $8^b$ and $8^c$, so that according to the positions in which the parts are bolted together the rabble feet will be placed, when desired, that is not one necessarily above another. A special adjustment of this kind is indicated by Fig. 11, and is in some cases important.

71, 72, 73, 74, are overlapping paths traveled by the shoes at the rabble feet ends, as per arrows in Fig. 2 where part of the furnace top is shown broken away.

All ore travels toward the same end in each hearth. Each rabble stem is inserted or removed through frames, casings, metal boxes, or apertures, as at 11, 12, in each furnace crown or top; these apertures are to be made of any suitable sizes. The water rabbles discharge water to pans 13 having outlet pipes 14, 14ª, to a gutter, launder, or pipe 15.

The bottoms of the rabble spindles enter apertures 101 in the lower hearth—and terminate in sockets 66 resting, somewhat below said hearth, on bearing posts 67, which have bearers 68 in recesses 5, 6. Each rabble stem has a plurality of stirring feet 89, 90, but not necessarily set one directly above another. The water rabble has screw plugged apertures 91 and at each foot end 92 to enable water passages 93, 94, 95, to be cleaned out. Each water rabble stem has a longitudinal partition 97, and each foot a longitudinal partition 98, so that water descends and ascends, and passes to and fro along each rabble foot and escapes by a branch 38 extending obliquely and having (see Fig. 3) a curved or bent nozzle 38ª fitted therein to allow of discharge to pan 13 or the like.

The frame or casing 11 has grooves for a slide 99 inserted after the rabble is in position and used to prevent fall of material from above. Frames 12 also have slides when desired. In the furnace sides are special apertures 100 to allow the slides to be inserted or removed.

When the rabbles are in place (their feet having at will stirring shoes as 96 Fig. 8) the crown casings or apertures 11, 12, are closed, as by blocks or bricks at 102 Fig. 8, and above that, at will, sand. At the bases 103 of casings as 12 are flanges to support the said blocks; the latter are at will dispensed with under slides or plates 99. Sand forms a useful upper surface in continuation of the surrounding hearth, also covered with any suitable layer of quartz sand, or the like, 104: in this manner, however, the furnaceman will follow any practice he deems suitable. Ore receivers 84, 85 feed any suitable screw conveyers, as 86 in inlet chambers or tubes 87, 88 (Fig. 10), so that from the inner end of each feed tube or chamber as 87 extending into the furnace side, the ore drops where desired upon a hearth. Parts 84, 87 appear in Figs. 12 to 14, where 58 is a hopper or ore bin, of any appropriate shape, dimensions, and materials (as of wood). At its base are a series of shafts 59, shown parallel, having screw propeller blades, or conveying means. The shaft ends turn in bearings outside the hopper, as at 59ª. Above the shafts are movable boards or slides 59ᵇ (one shown removed), to prevent ore charged into the hopper from injuring or clogging the conveyers; each slide or board is adjustable to allow ore to pass to the conveyers as required. Any suitable slide handles or accessories, not shown, are provided. As shafts 59 revolve, the screw blades push ore from hopper 58 to a transverse hopper 58ª, having a screw conveyer, as shaft 59ᶜ with screw propeller blades. Each shaft 59 has a gear wheel G, these being in mesh, and the middle shaft carries also a worm wheel, H, in gear with another C, on spindle J, driven by end sprocket wheel K, having chain L moved by sprocket wheel M, on shaft N having sprocket wheel O, turned by chain P passing over sprocket wheel Q (dotted in Fig. 13, it being behind the hopper) mounted on longitudinal main shaft 23 of the furnace; but any other suitable part of the rabble driving mechanism may be used to drive the feeder. I place mechanism in some cases to feed into both sides of the furnace, using shafts 23 and 24, but illustrate feed at one side only.

The delivery end of casing 58ª has a base outlet to tube 84, whereby ore is fed to casing 87, having feed shaft 82, which has a gear wheel 82ª—in Fig. 14—in mesh with a gear wheel 82ᵇ on shaft D, driven by sprocket wheel R actuated by chain S. On shaft N is a sprocket wheel M¹ driving a chain M², actuating sprocket wheel M³ on shaft 59ᶜ; and on shaft J is a sprocket wheel T actuating chain S.

The conveyers in chambers 58, 58ª, 87, rotate simultaneously; their speeds depend on the gearing and may be varied. The rate of revolution of shaft 82 is greater than that of shaft 59ᶜ, and that of the latter is greater than that of shafts 59. Shaft 82 may in practice revolve 10 times to one revolution of main shaft 23, so that comparatively small feed inlets to the furnace side suffice. So that the quantity of ore fed in may be regulated, each gear wheel G, on the two outer shafts of those marked 59, is provided with a clutch or suitable connection E, having actuating arm F or lever pivoted as at F¹; when desired either or both said wheels G is, by moving arm F, disengaged from the middle wheel G, and thus rotation of one or more conveyer shafts is stopped.

As a simple screw conveyer feed I may, as in Fig. 2, provide any suitable gear wheels 75, 76 to drive a shaft 77 and thereby sprocket wheels 78, 79, and chains 80 and 81, (Fig. 4), which turns sprocket wheels on conveyer spindles 82, 83. The sprocket wheels may be changed to produce the rate of feed desired. Ordinary screw feed conveyers do not provide closed chambers 87, 88, adapted to be opened and cleaned in the manner shown by Fig. 10, in which is an end casting 9 (having bearings for the conveyer spindle) attached as by removable bolts 39.

In the aforesaid casing 111 of the dropper or roasted ore discharge means, there are arranged, crossing or closing it, and one above another, any suitable number of flap valves, a pair as X, Y, being shown with respective spindles 106, 107. These valves so open and close that when one is open its neighbor or neighbors will be closed; dotted lines show open positions. Each is normally kept closed, the opening and closing operation occupying only a short time. Above each valve is, extending around the casing inner wall, any suitable abutment, as horizontal rib 105 (or it has opposite sides inclined as 105ᵇ, Fig. 18). This rib is or may be beveled or sloped at the upper side to prevent ore accumulating thereon, or the rib inclination as at 105ᵇ has that effect. Instead of the rib here is, in some cases, an inclined or other wall recess, as 105ᵃ. Each flap closes against the under side of a rib (or in a recess) preventing rise past it of air, or dust from roasted ore dropped below it. The flaps are operated by mechanism connected to the spindle of rotating rabble 37, and work as long as desired. A horizontal flap may be located to form part of a hearth to discharge therefrom, but where desired it is so placed that a slide over it, not shown, will be moved suitably when discharge is desired.

The discharge passage way as 111 has, in one or more parts, any suitable removable door or cover 108—Fig. 15—hinged or otherwise suitably connected, as to lugs 120 on the casing which may have projecting screw threaded pins or bolts; the cover may be removed or opened so that the flaps and the casing interior (visible in Fig. 17) may be attended to. The flap spindles have any suitable bearings as 123, 123ᵃ (the latter on plate 108) and may be removable. Plates 121 or like supports retain the spindles and flaps in working position.

Spindles 106, 107, project through the casing, and have connected to them cranks 110 and 109 respectively, connected to rods 110ᵃ, 109ᵃ (the latter dotted in Fig. 15), jointed or connected to respective levers as 114ᵃ, 114, pivoted as at 115ᵃ and 115 respectively, to any suitable supports on the furnace top, as lugs on framing 22. Axles or projections 126, 127, secured to these levers have bevel rollers or suitable members 124, 125, which fit against the face of a disk or plate 117 keyed to rabble spindle 37. The face of the latter has a projection or cam 118, or the like. Any of these flap operating connections may be made adjustable.

As spindle 37 revolves it rotates disk or wheel 117, the latter keeping in contact with members 124, 125, each of which is in turn depressed and raised by the action of cam or part 118. Fig. 15 shows wheel 124 at a moment of depression, on the point of return to normal position. The parts of the mechanism are to be so adjusted relatively to one another that the effect of the spindle rotation is to oscillate levers 114ᵃ, 114, in turn causing movement of rods 110ᵃ, 109ᵃ, and cranks 110, 109, and spindles 106, 107, whereby each flap as X or Y will open and close, while its neighbor remains closed. When four flaps are used to each casing the first and third are, in some cases, connected by cranks to rod 110ᵃ, and the second and fourth to rod 109ᵃ. Either by the weight of the parts, or otherwise, as by the aid of one or more suitably placed springs, the mechanism keeps the flaps normally closed, except for the brief openings indicated.

Instead of cam 118 and members 124, 125, being below disk 117, they could be arranged above it, and any part of the furnace driving mechanism by which the rabbles are ultimately caused to rotate may be arranged to work my discharge passage flaps.

Dropping means are not necessarily limited to one side of the furnace; and, at will, more than one rabble spindle is usable to allow working of dropping mechanisms for more than one hearth. After leaving the dropping device, the ore may be received by any conveyer, or as desired.

What I claim as my invention is:—

1. In longitudinal hearth ore roasting furnaces, a crown having a series of apertures for insertion and removal of rabbles,—casings in said apertures,—slides or plates supported in or by said casings, and furnace side apertures for insertion and removal of the said slides.

2. In longitudinal superimposed hearth ore roasting furnaces, a crown having a series of apertures for rabble stems, in combination with slides or means insertible from the furnace sides to assist in closing said apertures.

3. Superimposed non-communicating overlapping furnaces, having longitudinal hearths, and at one end and side independent fireplaces oblique to one another; and, at the other, independent flue exits with adjacent dampers substantially as described.

4. Superimposed ore roasting furnaces, having firebridges of different width, which overlap, with fireplaces at different heights in oblique alinement.

5. A pair of superimposed independent roasting furnaces, a fire place communicating with the lower furnace, a second fire place communicating with the upper furnace above the first fire place, and an air passage leading from beneath the grate of the second fire place to a point above the grate of the first fire place, substantially as described.

In witness whereof I have hereunto set my hand in the presence of two witnesses.

THOMAS EDWARDS.

Witnesses:
 BEATRICE M. LOWE,
 ALICE M. HOLT.

Copies of this patent may be obtained for five cents each, by addressing the "Commissioner of Patents, Washington, D. C."